United States Patent [19]

Albini

[11] Patent Number: 5,626,984
[45] Date of Patent: May 6, 1997

[54] BATTERY TERMINAL SYSTEM

[76] Inventor: Salvatore Albini, 445 Highland Ave., Waterbury, Conn. 06708

[21] Appl. No.: 558,453

[22] Filed: Nov. 16, 1995

[51] Int. Cl.⁶ ............................................. H01M 2/26
[52] U.S. Cl. ................ 429/178; 429/121; 429/65; 429/181; 429/182; 429/180
[58] Field of Search ....................... 429/178, 121, 429/65, 181, 182, 180

[56] References Cited

U.S. PATENT DOCUMENTS

| | | | |
|---|---|---|---|
| D. 352,272 | 11/1994 | Thuerk | D13/120 |
| 1,176,942 | 3/1916 | Bliss | |
| 1,759,043 | 8/1930 | Derby | |
| 1,833,395 | 11/1931 | Ford | |
| 2,621,222 | 12/1952 | Wirth | 136/171 |
| 2,675,532 | 4/1954 | Quick | 339/224 |
| 4,042,759 | 8/1977 | Cella | 429/121 |
| 4,389,471 | 6/1983 | Woodhouse | 429/178 |
| 4,859,547 | 8/1989 | Adams et al. | 429/121 |
| 4,879,191 | 11/1989 | Sindorf | 429/181 |
| 4,929,522 | 5/1990 | Ward et al. | 429/178 |
| 5,015,543 | 5/1991 | English | 429/65 |
| 5,208,117 | 5/1993 | Vemilli et al. | 429/72 |
| 5,326,655 | 7/1994 | Mix et al. | 429/178 |
| 5,403,678 | 4/1995 | Fields | 429/65 |
| 5,427,552 | 6/1995 | Zielinski et al. | 439/845 |

*Primary Examiner*—Kathryn L. Gorgos
*Assistant Examiner*—Kishor Mayekar
*Attorney, Agent, or Firm*—Robert A. Seemann

[57] ABSTRACT

A lead terminal post extending upward through the top of an insulator wall of a battery includes a plurality of flat vertical sides fused continuously from its top to below the top of the insulator wall, to a harder, metallic, cap having a plurality of flat vertical sides. The metallic cap is covered with a plastic cap that extends below the metallic cap, below the top of the insulator wall, and is sealed to the insulator wall. A terminal bar having parallel walls extends from a flat wall of the cap, through the plastic cap, normal to the flat wall, and contains a removably mounted connector having a leaf spring connection with the terminal bar and an element within the connector adjacent to and connected to the leaf spring, that prevents horizontal rotation of the connector on the bar. A plastic overseal on the connector makes a seal with the plastic cap when the connector is fully mounted on the terminal bar. The terminal bar may be a dedicated electrically negative terminal for carrying starter current, and may have a connector fastener.

8 Claims, 4 Drawing Sheets

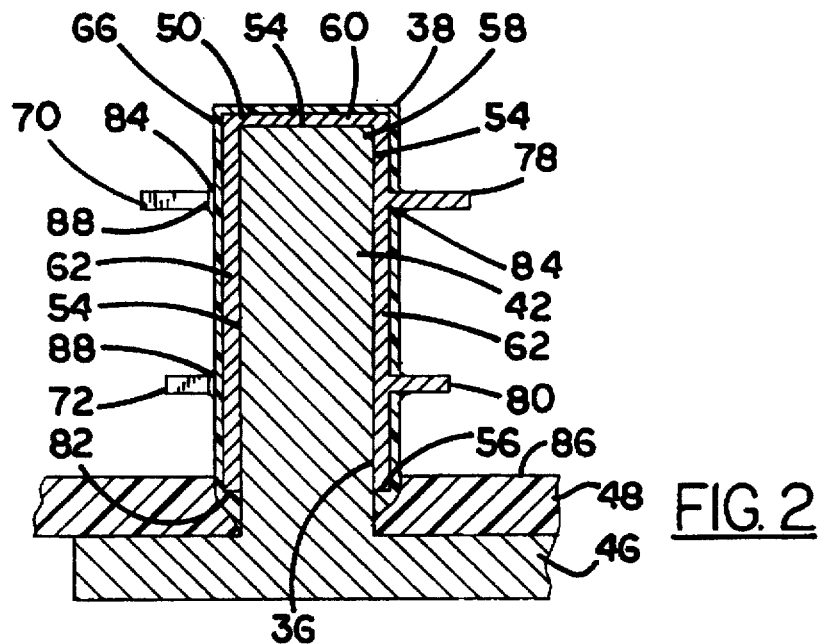

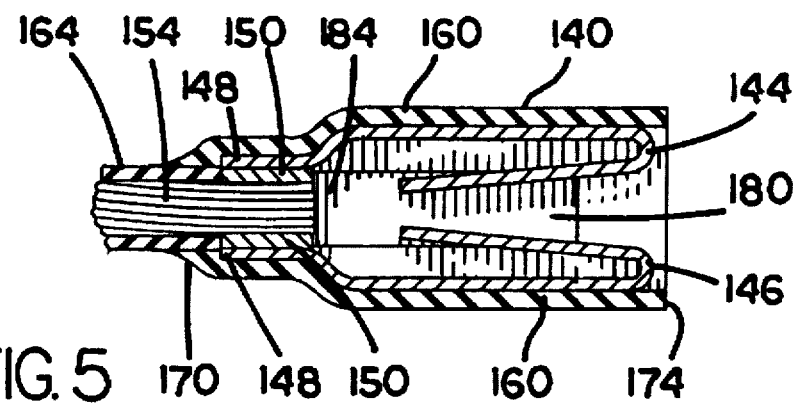
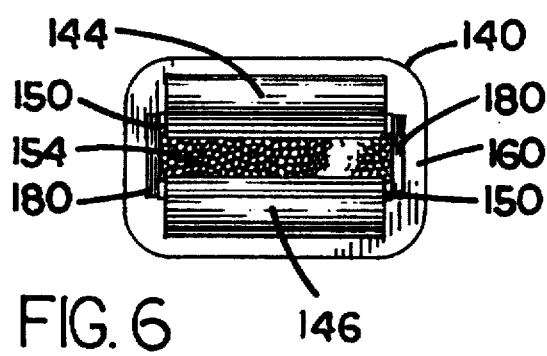
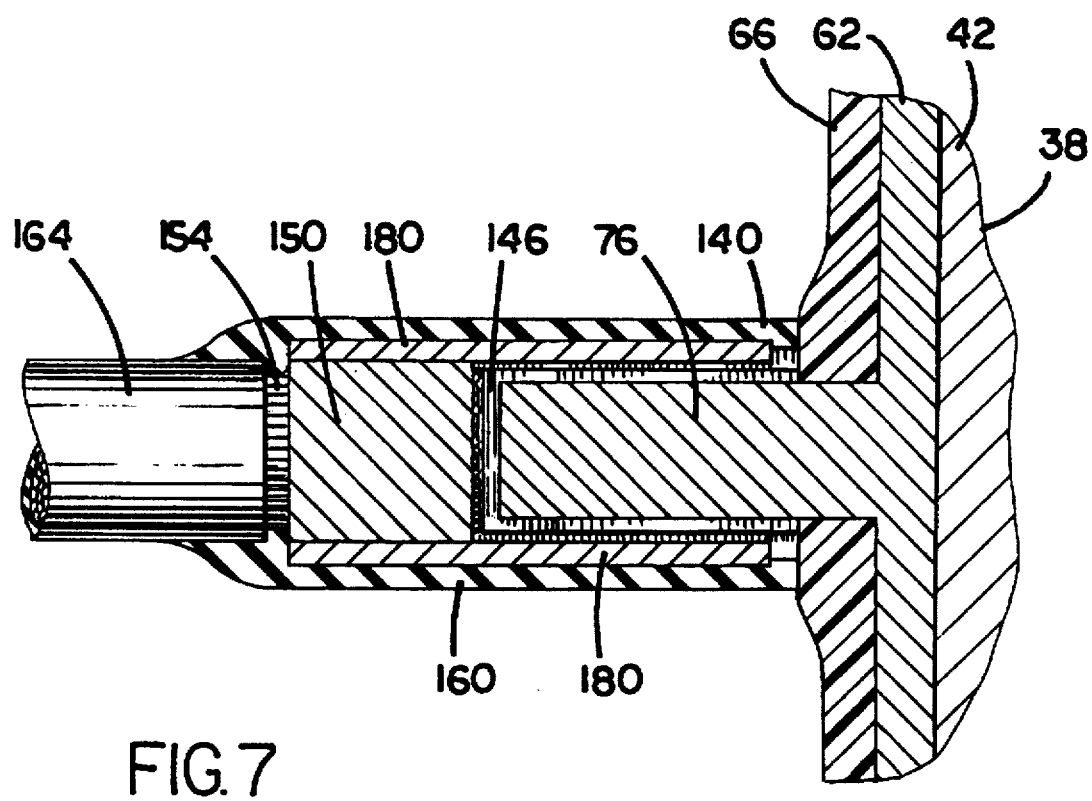

BATTERY TERMINAL SYSTEM

BACKGROUND OF THE INVENTION

1. Field of the Invention:

This invention pertains to electric battery connection, more specifically to an external terminal and means for electrical connection with the terminal.

2. Description of the Prior Art:

The art is replete with patented inventions for providing a corrosion resistant terminal connection system. For example;

U.S. Pat. No. 5,403,678 patented Apr. 4, 1995 by K. B. Fields describes an inverted cup shaped copper cap that is fastened on to a battery terminal by a set screw or by internal threads. A grease fitting on an upstanding stud terminal member is connected to an internal passageway for delivering grease to spaces that surround the battery post to prevent water, moisture, air and acid from coming into contact with the battery post.

U.S. Pat. No. 4,929,522 patented May 29, 1990 by Ward et al. describes an insulated conductor cable having the cable conductor permanently connected concentrically U.S. Pat. No. 4,929,522 describes an insulated conductor cable having the cable conductor permanently connected concentrically into the battery terminal, and the battery case insulation sealed over the battery terminal and to the jacket insulator of the conductor cable.

U.S. Pat. No. 1,833,395, patented Nov. 24, 1931 by B. Ford describes a collar terminal connector on a battery terminal post having grooves for retaining grease between the surfaces of the post and the terminal connector.

U.S. Pat. No. 5,326,655, patented Jul. 5, 1994 by Mix et al. describes a lead alloy collar having a horizontal blade cast within the collar. The casting has an axial opening which is common to the collar and blade, by which the casting is positioned and welded on a hollow cylindrical bushing which is mounted on the battery terminal post.

SUMMARY OF THE INVENTION

It is one object of the invention to provide a battery terminal system which prevents corrosion of electrical connections to the lead terminal post of a battery.

It is another object that the battery terminal system comprises an element that is fused to the lead terminal post of the battery.

It is another object that the system provides a simple way to connect and disconnect a battery from a vehicle's electrical charging, starting, and accessory electrical supply system.

It is another object to provide a battery terminal system that connects and disconnects without applying damaging torque to the lead battery posts.

It is another object to provide a battery terminal system that connects without bolting connectors to the battery.

It is another object to eliminate lead on lead connection between a connector and a battery terminal.

It is another object that the system provides a quick connect, removable, corrosion resistant connection to the element.

It is another object that a connector can be easily removed to check for corrosion of the connection surfaces.

It is another object that corrosion may be easily removed by steel wool or other polishing material by cleaning terminal surfaces which are flat and which are relatively hard compared to lead.

It is another object that the system has relatively large current transfer surface areas throughout its construction.

It is another object that the element comprises a square cap.

It is another object that specialized negative and positive caps be provided, the negative cap being designed to prevent jump-start attachment to the negative cap.

Other objects and advantages of the invention will become apparent to persons skilled in the art from the ensuing description.

A lead terminal post extends upward through the top of an insulator wall of a battery and has a circumferential wall from the top. A metallic cap mounted on the lead terminal post covers the top of the post, surrounds the circumferential wall, and extends below the top of the battery insulator wall.

The cap preferably is harder than lead and has an electrical resistance/cm that is at least as low as the electrical resistance/cm of lead.

Preferably the circumferential wall of the lead terminal post comprises a plurality of flat sides extending vertically from the insulator wall.

The cap comprises a plurality of flat sides extending vertically from the insulator wall, and is fused generally continuously to the lead terminal post over the contiguous inner surface of the cap and circumferential wall of the lead terminal post from the top of the lead terminal post to the bottom of the cap.

A terminal bar which is an integral formed part of the cap extends from a flat side of the cap generally normal to the flat side.

A plastic shell on the cap covers inclusively the top of the cap, the plurality of flat sides to the bottom of the cap, and extends below the top of the insulator wall of the battery. The terminal bar extends through the plastic shell.

Preferably the shell is hermetically sealed to the insulator wall of the battery, and seals to and around the terminal bar.

An electrical connector includes a metallic wire at the back end of the connector, an insulator sleeve on the wire, and an opening at the front end of the connector of sufficient size for removably mounting the electrical connector on the terminal bar with the terminal bar in the connector.

The electrical connector also includes leaf spring means electrically connected to the metallic wire, and means for preventing substantial horizontal rotation of the connector when the connector is fully mounted on the terminal bar, mounted in the connector adjacent to the leaf spring means and attached to the leaf spring means.

A plastic jacket covers the electrical connector from the front end of the connector to the back end of the connector, is hermetically sealed to the insulator sleeve, and extends at the front end sufficiently so that the plastic jacket makes a water resistant seal with the insulator shell when the connector is fully installed on the terminal bar.

A dedicated electrical ground terminal bar may be included on the cap for receiving the connector, and means for fastening the connector to the terminal bar.

BRIEF DESCRIPTION OF THE DRAWINGS

In order that the invention be more fully comprehended, it will now be described, by way of example, with reference to the accompanying drawings, in which:

FIG. 2 is a sectional view of a terminal post element of the battery system of FIG. 1, viewed along 2—2.

FIG. 3 is a sectional view of a terminal post of the battery system of FIG. 1, viewed along 3—3.

FIG. 4 is a connector of a battery terminal system of the invention.

FIG. 5 is a partial sectional view of the connector of FIG. 4, viewed along 5—5.

FIG. 6 is an end view of the connector of FIG. 4, viewed along 6—6.

FIG. 7 is a partial sectional top view of the connector of FIG. 5 connected to a terminal bar of a terminal post element of the invention.

DESCRIPTION OF THE PREFERRED EMBODIMENTS

Figure 1:
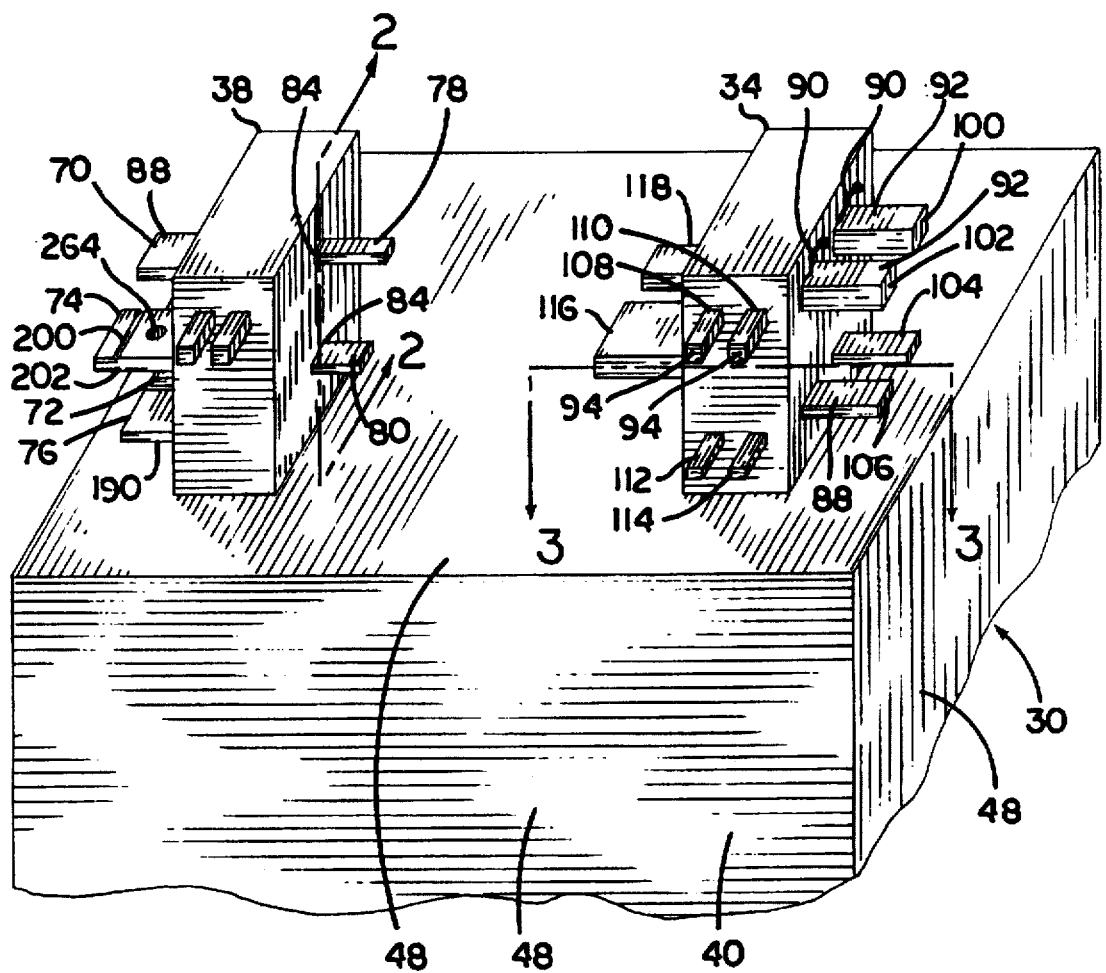
FIG. 1 is a perspective view of a battery terminal system of the invention.

Before explaining the invention in detail, it is to be understood that the invention is not limited in its application to the detail of construction and arrangement of parts illustrated in the drawings since the invention is capable of other embodiments and of being practiced or carried out in various ways. It is also to be understood that the phraseology or terminology employed is for the purpose of description only and not of limitation.

In FIGS. 1–3, battery terminal system 30 includes electrically positive terminal post element 34 and electrically negative terminal post element 38 mounted in insulator wall 48 of battery 40. Insulator wall 48 is of a plastic material such as plastic or hard rubber according to good battery construction.

In terminal post element 38, copper based cap 50 is fused 54 generally continuously to lead terminal post 42 of negative buss bar 46 of the battery. Fusion is by soldering, brazing or other metallic fusion bonding between the contiguous surfaces of post 42 and cap 50 inclusive from the bottom 56 to the top 58 of the circumferential wall 62 of the cap, and the annular area of the top 60 of the cap. Terminal post 42 circumferential wall 36 may be round as in conventional lead battery posts for lead acid batteries for vehicles, however, circumferential wall 36 is preferably generally squared off for reasons explained later.

Circumferential wall 62 of the cap takes on the generally squared off, that is square or rectangular, shape of terminal post 42. Cap 50 preferably extends below outer surface 86 of insulator wall 48.

The fusion bond between the copper based cap and lead terminal post 42 is essentially complete and continuous. It provides complete and continuous electrical conduction between the lead terminal post and all inner surfaces of the cap, and excludes moisture and corrosion from the interfaces.

Square or rectangular terminal post 42 and cap 50 provides a relatively larger mutual conducting area than a round design, a stronger and wider support for the base of each terminal bar 72, 74, 76, 78 and 80 which are copper based extensions from cap 50.

Insulator shell 66 covers cap 50 completely in continuous intimate contact with the outer surface of circumferential wall 62 of cap 50, from the bottom 56 to the top 58 and over annular top 60.

Shell 66 seals around each terminal bar 70, 72, 74, 76, 78 and 80 where each terminal bar connects 84 with cap 50. Preferably the terminal bars are formed integrally with cap 50, although they may be braised or welded to the cap.

The extending portion 88 of each terminal bar is left bare for receiving a connector. Preferably a plastic, meaning plastic, rubber or similar material, boot 92, 94 is included on each terminal bar at time of manufacture in order to keep the metal surface corrosion free. The boot is removed in order to make way for a connector when the connector is installed. Preferably the boot is sealed to insulator shell 66, and may be removed by cutting and peeling. Tear cord 90 may be provided wrapped around the terminal bar so that it parts the boot from insulator shell when it is pulled away from the terminal bar.

Once the factory installed boot is removed, it is difficult to replace by slipping on. If the bare terminal bar is not to be used, the bar may be protected from corrosion by applying a brush or dip insulation such as Plastic DIP (tm) or a similar plastic or rubber coating. The bare copper based terminal bar may also be easily cleaned with steel wool.

Insulator shell 66 which is a plastic, such as plastic, rubber or similar waterproof and electrically insulating material, forms a liquid tight seal with insulator wall 48. Shell 66 preferably extends below the bottom 56 of cap 50, under 82 cap 50, comes into contact with the surface of terminal post 42, surrounds terminal post 42 below cap 50, has a circumferential liquid tight seal with insulator wall 48 at and below outer surface 86 of wall 48, and further has a circumferential liquid tight seal with insulator wall 48 below bottom 56 of cap 50. This prevents withdrawal from aging and shrinkage of insulator shell 66 from wall 48 and loss of seal therewith.

In terminal post element 34, lead terminal post 44 is intimately fused with circumferential wall 64 of copper based cap 52 which is formed in one integral piece with terminal bars 100, 102, 104, 106, 108, 110, 112, 114, 116, and 118.

Terminal bars 100, 102, 108, and 110 carry boots 92 or 94.

Insulator shell 124 seals around cap 52 and around the terminal bar at the connection 128 for example between terminal bar 116 and cap 52 as described earlier.

Insulator shells 66 and 124 are color coded to indicate polarity of the battery terminal and cap upon which the insulator shells are mounted, such as a red plastic for positive polarity and black plastic for negative polarity.

Although caps 50 and 52 are described with the term "copper based", the caps may be made of a metal or metal alloy having an electrical resistance/cm about the same as or lower than the electrical resistance of lead, that is harder than lead, and that can be fused to the lead terminal post as described earlier. The metal or metal alloy preferably also is one that resists gross corrosion, for example, copper, nickel, and silver.

Connector 140 in FIGS. 4, 5 and 6 includes a pair of folded leaf springs 144, 146 attached at back ends 148 of the springs to wire holding blocks 150 which are fused with wire strands 154 of wire 156, for example, by soldering or welding.

The leaf springs are of a flexible metal, preferably non lead bearing.

Plastic water and electrical insulator jacket 160 is water tight sealed to wire sleeve insulation 164 at back end 170 of connector 140, and extends to the front end 174 of the connector whereby the jacket may contact the insulator shell of the tab upon which the connector is mounted to provide a moisture resistant seal between the jacket and the insulator shell.

A pair of side bars 180 are attached at their back ends 184 to holding blocks 150, and extend forward to near the front 174 of the connector.

In FIG. 7, connector 140 is mounted on terminal bar 76 which is shown in section. Leaf spring 146 is in electrical contact with the bottom side, see FIG. 1, 190, of terminal bar 76.

Horizontal movement of connector 140 on terminal bar 76 is prevented by side bars 180 which are fastened to wire holding blocks 150, the upper one of which is shown in section.

Figure 8:
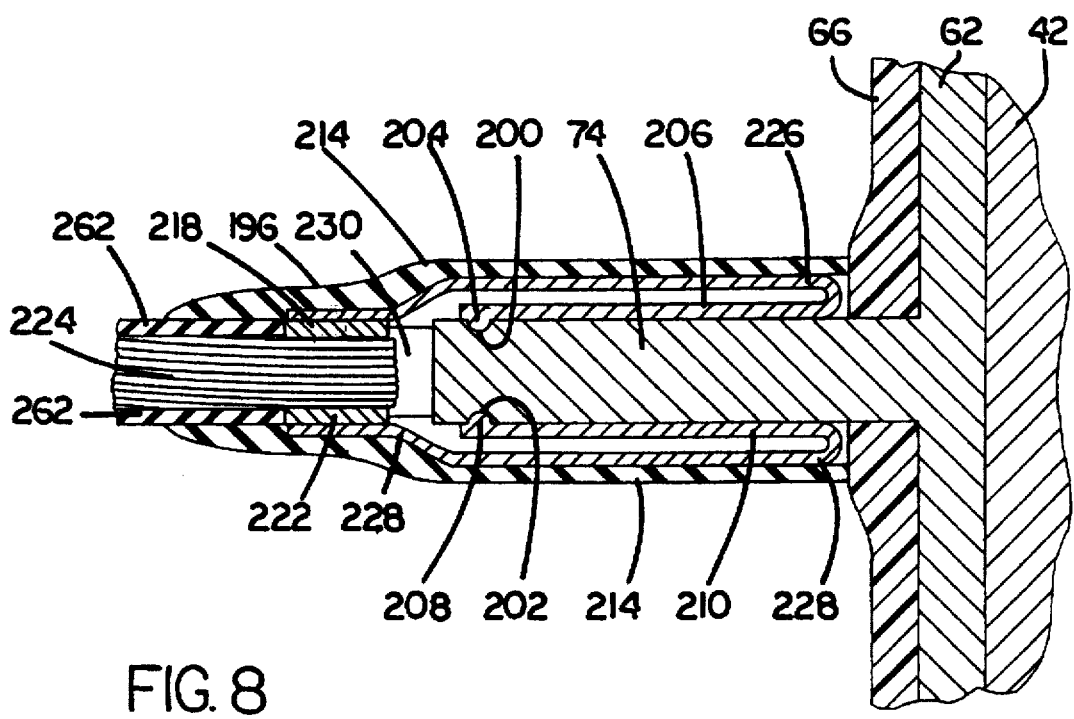
FIG. 8 is a partial sectional side view of a connector of a battery terminal system of the invention, connected to a terminal bar of a terminal post element of the invention.

In FIG. 8, connector 196 is mounted on terminal bar 74 which has upper and lower horizontal grooves 200 and 202 for interlocking with horizontal ridge 204 on upper leaf spring arm 206 and horizontal ridge 208 on lower leaf spring arm 210 respectively.

A water resistant seal is made between jacket 214 and insulator shell 66 when connector 196 is fully slid on terminal bar 74 and ridges 204 and 208 are in grooves 200 and 202.

Wire holding blocks 218 and 222 hold wire 224, upper leaf spring 226, lower leaf spring 228, and the side bars only one 230 of which is shown.

Figure 9:
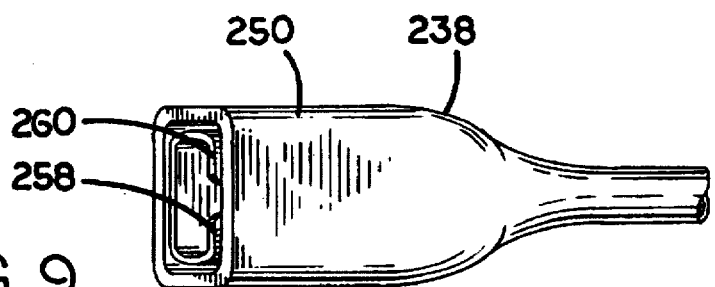
FIG. 9 is a perspective view of another connector of a battery terminal system of the invention.
Figure 10:
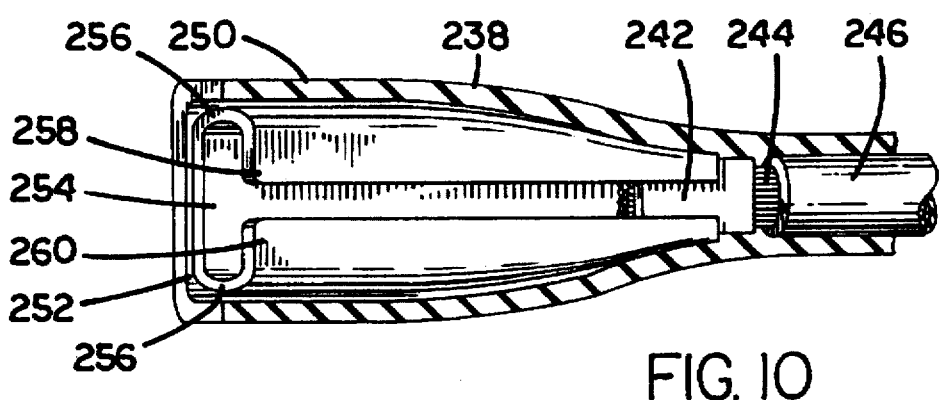
FIG. 10 is a partial sectional view of the connector of FIG. 9.

In FIGS. 9 and 10, connector 238 includes ferrule 242 which is fastened to wire strands 244 of electrical cable 246. Flexible plastic, or similar water and electrical insulating jacket 250 extends to the open end 252 of connector 238 at the front of the connector, and is water tight bonded to wire sleeve insulation 262 at the back of the connector.

Upper leaf spring 254 folds over along longitudinal folds 256, forming lower leaf springs 258 and 260. The leaf springs are fastened to ferrule 242. Folds 256 prevent horizontal rotation of connector 238 when it is mounted on a terminal bar of a terminal post element described above.

When connector 238 is fully installed on a terminal bar, jacket 250 contacts the insulator shell, forming a water resistant seal between the connector and the shell.

A petroleum jelly may be inserted at the contact junction between the jacket of the connector and the insulator shell of the terminal post element to enhance the seal between the jacket and shell when the connector is fully installed on the terminal bar.

The connectors are preferably made in sizes which closely fit the terminal bars to prevent horizontal rotation of the connector on the bar, and to provide a large spring loaded contact area between the leaf spring and the bar surface.

Terminal bar 74 has sufficient cross sectional area to carry starter current for starting an automobile engine. Preferably fastener hole, see FIG. 1, 264, is provided for fastening the connector on the terminal bar.

As the remaining terminal bars on terminal post element 38 are each designed for lower current load, without convenient access to terminal bar 74 due to the fastened-on connector, the negative battery connection for jump starting the engine must be made to the metal ground body of the engine or automobile. This reduces the chance of sparking in the vicinity of the battery when the positive jumper cable is attached to terminal bar 118 which is provided for the sole purpose of jump starting, before attaching the negative jumper cable to body ground. A relatively rigid slip-on boot is preferably provided for terminal bar 118 so that it can be removed for the jump start attachment.

The descriptive term "plastic" is meant to include plastic, rubber and similar materials.

Although the present invention has been described with respect to details of certain embodiments thereof, it is not intended that such details be limitations upon the scope of the invention. It will be obvious to those skilled in the art that various modifications and substitutions may be made without departing from the spirit and scope of the invention as set forth in the following claims.

What is claimed is:

1. A battery terminal system comprising:
    a battery housing comprising an insulator panel having a top side and a bottom side, a lead terminal post being solid, having an outer surface, a top end and a bottom end, said bottom end being connected in said housing to a bus, said terminal post extending through said bottom side and said top side of said insulator panel of said battery, a metallic cap being a unitary continuous element harder than lead and having an electrical resistance/cm at least as low as that of lead, cup shaped, having a top and a bottom, covering said lead terminal post from over said top end of said terminal post to below said top side of said insulator and being fused directly to the outer surface of said terminal post below said top side of said insulator panel, and a stiff terminal bar extending from said metallic cap being an integrally formed portion of said unitary continuous element.

2. The terminal system of claim 1 wherein said cap is fused generally continuously to said outer surface of said lead terminal post.

3. The terminal system of claim 1 further comprising a plastic shell on said cap from said top of said cap, said plastic shell being an element that is formed independently of said insulator panel of said battery and being hermetically sealed to said insulator panel of said battery, said cap spacing said plastic shell from said terminal post above said top side of said insulator panel.

4. The terminal system of claim 2 wherein said plastic shell extends below said top side of said insulator panel of said battery and further spaces said insulator panel from said terminal post below said top side of said insulator panel.

5. The terminal system of claim 4, further comprising a first terminal bar extending from said cap, an electrical connector having a front end, a back end, a pair of parallel leaf springs spaced from one another having a front end and a back end, a pair of parallel rigid metallic bars spaced from one another and spaced from and parallel with said leaf springs and having a front end and a back end, said back end of said leaf springs and said back end of said metallic bars being rigidly fastened to a rigid block for holding wire, a metallic wire attached to said rigid block at said back end of said electrical connector, an insulator sleeve on said wire, an opening at said front end of said electrical connector of sufficient size for removably mounting said electrical connector on said first terminal bar with said terminal bar in said connector, and a plastic jacket covering said electrical connector from said front end of said connector to said back end of said connector and hermetically sealed to said insulator sleeve, said plastic jacket extending at said front end sufficiently to make a water resistant seal with said plastic shell when said connector is fully installed on said terminal bar.

6. The terminal system of claim 4 wherein said first terminal bar is a dedicated electrical ground terminal bar having sufficient cross sectional area to carry starter current, and means for fastening said connector on said electrical ground terminal bar.

7. The terminal system of claim 1, wherein said cap comprises a plurality of flat sides extending vertically from said insulator panel of the battery housing, and said stiff terminal bar further comprises extending from a flat side of said cap generally normal to the flat side from which it extends, said stiff terminal bar being an integrally formed part of said cap, and said first terminal bar comprising a plurality of parallel flat sides.

8. A battery terminal system comprising:

a battery housing comprising an insulator panel having a top side and a bottom side, a lead terminal post being solid having an outer surface, a top end and a bottom end, said bottom end being connected in said housing to a bus, said terminal post extending through said bottom side and said top side of said insulator panel of said battery, a metallic cap being a unitary continuous element harder than lead and having an electrical resistance/cm at least as low as that of lead having a top and a bottom, covering said lead terminal post from over said top end of said terminal post to below said top side of said insulator and being fused directly to the outer surface of said terminal post below said top side of said insulator panel, and a stiff terminal bar fused to and extending from said metallic cap.

* * * * *

UNITED STATES PATENT AND TRADEMARK OFFICE
CERTIFICATE OF CORRECTION

PATENT NO. : 5,626,984
DATED : May 6, 1997
INVENTOR(S) : Salvatore Albini

It is certified that error appears in the above-identified patent and that said Letters Patent is hereby corrected as shown below:

In claim 4, column 6, line 37, change "2" to --3--.

Signed and Sealed this

Twelfth Day of August, 1997

Attest:

BRUCE LEHMAN

Attesting Officer     Commissioner of Patents and Trademarks